(12) United States Patent
Farooq et al.

(10) Patent No.: US 9,975,400 B2
(45) Date of Patent: May 22, 2018

(54) METHOD OF CONTROLLING CLIMATE IN A PARKED VEHICLE

(71) Applicant: FORD GLOBAL TECHNOLOGIES, LLC, Dearborn, MI (US)

(72) Inventors: Iskander Farooq, Oakland, MI (US); Mohammed Omar Faruque, Ann Arbor, MI (US); Dean M Jaradi, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 210 days.

(21) Appl. No.: 14/743,283

(22) Filed: Jun. 18, 2015

(65) Prior Publication Data

US 2016/0368345 A1 Dec. 22, 2016

(51) Int. Cl.
*B60H 1/00* (2006.01)

(52) U.S. Cl.
CPC ..... *B60H 1/00778* (2013.01); *B60H 1/00771* (2013.01)

(58) Field of Classification Search
CPC .......... B60H 1/00778; B60H 1/00771
USPC .................................. 165/202, 271
See application file for complete search history.

(56) References Cited

U.S. PATENT DOCUMENTS

| | | | | |
|---|---|---|---|---|
| 4,418,743 A * | 12/1983 | Dietzsch | ............ | B60H 1/00885 165/202 |
| 4,462,461 A * | 7/1984 | Grant | ................. | B60H 1/00014 165/101 |
| 4,694,798 A * | 9/1987 | Kato | ..................... | F02D 41/083 123/339.17 |
| 5,063,513 A | 11/1991 | Shank et al. | | |
| 5,937,941 A * | 8/1999 | Gach | .................. | B60H 1/00735 165/202 |
| 6,055,817 A * | 5/2000 | Wieszt | ............... | B60H 1/00778 236/91 C |
| 6,108,602 A * | 8/2000 | Bairamis | ............ | B60H 1/00735 701/36 |
| 6,357,244 B1 * | 3/2002 | Mori | ................... | B60H 1/00642 165/202 |
| 6,532,926 B1 * | 3/2003 | Kuroda | ............... | B60H 1/00778 123/179.4 |
| 6,636,808 B1 * | 10/2003 | Brown | ............... | B60H 1/00735 236/1 C |
| 6,705,938 B2 * | 3/2004 | Everhart | ............ | B60H 1/00257 165/202 |
| 7,650,864 B2 | 1/2010 | Hassan et al. | | |

(Continued)

FOREIGN PATENT DOCUMENTS

KR 20110136283 A 12/2011
WO 2014035298 A1 3/2014

*Primary Examiner* — Ljiljana Ciric
(74) *Attorney, Agent, or Firm* — Vichit Chea; King & Schickli, PLLC

(57) ABSTRACT

A method of controlling a temperature in a vehicle passenger compartment of a parked vehicle includes the steps of: (a) sensing a temperature inside the vehicle at a predetermined time; (b) comparing the sensed temperature to a preferred temperature; (c) confirming an absence of any object near a front and a rear of the parked vehicle; (d) turning on an engine of the parked vehicle if the absence of any object is confirmed and the sensed temperature is not the preferred temperature; and (e) utilizing a climate control system to change the temperature inside the vehicle passenger compartment.

20 Claims, 3 Drawing Sheets

(56) References Cited

U.S. PATENT DOCUMENTS

| | | | | |
|---|---|---|---|---|
| 8,649,941 | B1* | 2/2014 | Tsuda | B60H 1/00771 701/49 |
| 9,008,858 | B1* | 4/2015 | Payne | B60H 1/00771 701/1 |
| 9,352,635 | B1* | 5/2016 | Schepmann | B60H 1/00392 |
| 9,744,829 | B2* | 8/2017 | Wang | B60H 1/00778 |
| 9,764,618 | B2* | 9/2017 | Miller | B60H 1/00964 |
| 9,783,022 | B2* | 10/2017 | Matsuoka | B60H 1/00207 |
| 9,783,023 | B2* | 10/2017 | An | B60H 1/00978 |
| 9,783,024 | B2* | 10/2017 | Connell | B60H 1/00985 |
| 9,809,083 | B2* | 11/2017 | Xia | B60H 1/005 |
| 9,809,085 | B1* | 11/2017 | Pierce | B60H 1/00742 |
| 9,830,820 | B2* | 11/2017 | Semsey | G08G 1/14 |
| 2002/0066281 | A1* | 6/2002 | Gunasekera | B60H 1/00778 62/186 |
| 2002/0145516 | A1* | 10/2002 | Moskowitz | B60H 1/00742 340/522 |
| 2002/0161501 | A1* | 10/2002 | Dulin | B06B 1/0215 701/45 |
| 2004/0076015 | A1* | 4/2004 | Aoki | B60H 1/00735 362/503 |
| 2004/0194479 | A1* | 10/2004 | Umebayashi | B60H 1/00642 62/126 |
| 2004/0226708 | A1* | 11/2004 | Gutbrod | B60H 1/0075 165/202 |
| 2005/0021224 | A1* | 1/2005 | Gray | B60H 1/00771 701/36 |
| 2005/0024188 | A1* | 2/2005 | Sider | B60H 1/00642 340/425.5 |
| 2005/0109499 | A1* | 5/2005 | Iwanami | B60H 1/00778 165/202 |
| 2006/0075766 | A1* | 4/2006 | Ziehr | B60H 1/00778 62/186 |
| 2006/0105698 | A1* | 5/2006 | Butera | B60H 1/00742 454/256 |
| 2006/0264221 | A1* | 11/2006 | Koike | G06Q 10/08 455/456.1 |
| 2007/0119959 | A1 | 5/2007 | Wieszt | |
| 2007/0131782 | A1* | 6/2007 | Ziehr | B60H 1/0075 236/1 B |
| 2007/0144723 | A1* | 6/2007 | Aubertin | B60H 1/00642 165/202 |
| 2007/0163771 | A1* | 7/2007 | Straub | B60H 1/00735 165/202 |
| 2008/0009988 | A1* | 1/2008 | Metzger | B60H 1/00771 701/36 |
| 2009/0082967 | A1* | 3/2009 | Hara | B60H 1/00735 701/530 |
| 2009/0130965 | A1* | 5/2009 | Galvez-Ramos | B60H 1/00428 454/75 |
| 2009/0150024 | A1* | 6/2009 | Kojima | B60H 1/00642 701/36 |
| 2009/0193825 | A1* | 8/2009 | Hara | B60H 1/00642 62/132 |
| 2010/0132388 | A1* | 6/2010 | Oyobe | B60H 1/004 62/157 |
| 2010/0163220 | A1* | 7/2010 | Nakajima | B60H 1/00785 165/202 |
| 2010/0194552 | A1* | 8/2010 | Jaisimha | B60Q 1/143 340/438 |
| 2011/0022257 | A1* | 1/2011 | Kumagai | B60H 1/00642 701/22 |
| 2011/0127025 | A1* | 6/2011 | Bohme | B60H 1/00271 165/202 |
| 2011/0290895 | A1* | 12/2011 | Yin | B60H 1/00742 237/12 |
| 2011/0291828 | A1* | 12/2011 | Walker | G06Q 10/08 340/539.27 |
| 2012/0080178 | A1* | 4/2012 | Scholl | B60H 1/00385 165/200 |
| 2012/0152511 | A1* | 6/2012 | Chang | B60H 1/00428 165/202 |
| 2012/0259534 | A1* | 10/2012 | Wakou | F02N 11/0818 701/113 |
| 2012/0266610 | A1* | 10/2012 | Lifson | B60H 1/00657 62/56 |
| 2012/0267442 | A1* | 10/2012 | Choi | G05D 23/1902 236/51 |
| 2012/0282913 | A1* | 11/2012 | Kaindl | B60H 1/00657 455/420 |
| 2012/0318489 | A1* | 12/2012 | Harry | B60H 1/00778 165/200 |
| 2013/0079978 | A1* | 3/2013 | Uyeki | B60H 1/00657 701/36 |
| 2013/0141578 | A1* | 6/2013 | Chundrlik, Jr. | H04N 7/181 348/148 |
| 2013/0151037 | A1* | 6/2013 | Harumoto | B60H 1/00657 701/2 |
| 2013/0151038 | A1* | 6/2013 | Harumoto | G06F 17/00 701/2 |
| 2013/0317728 | A1* | 11/2013 | Hall | B60H 1/00778 701/113 |
| 2014/0081481 | A1* | 3/2014 | Nishida | B60H 1/00771 701/2 |
| 2014/0100716 | A1* | 4/2014 | Kawai | B60L 11/14 701/2 |
| 2014/0129063 | A1* | 5/2014 | Clark | B60W 10/08 701/22 |
| 2014/0223950 | A1* | 8/2014 | Janeling | B60H 1/005 62/333 |
| 2015/0041113 | A1* | 2/2015 | Enke | B60H 1/00392 165/202 |
| 2015/0114016 | A1* | 4/2015 | Ota | B60H 1/00778 62/133 |
| 2015/0129192 | A1* | 5/2015 | Boss | B60H 1/00878 165/202 |
| 2015/0142212 | A1* | 5/2015 | Gross | G07C 5/008 701/2 |
| 2015/0191073 | A1* | 7/2015 | Bjorkerud | B60H 1/00778 454/75 |
| 2015/0224851 | A1* | 8/2015 | Baker | B60H 1/00792 165/202 |
| 2015/0283879 | A1* | 10/2015 | Tjandra | B60H 1/00778 165/202 |
| 2016/0001631 | A1* | 1/2016 | Geissenhoener | B60H 1/00778 165/202 |
| 2016/0016480 | A1* | 1/2016 | Kim | B60L 11/1846 701/22 |
| 2016/0059674 | A1* | 3/2016 | Kim | B60K 35/00 701/36 |
| 2016/0075210 | A1* | 3/2016 | Quaranta-Guido | B60Q 9/00 701/48 |
| 2016/0082809 | A1* | 3/2016 | Wang | B60H 1/00778 454/139 |
| 2016/0103111 | A1* | 4/2016 | Griffin | G01N 33/0067 73/25.01 |
| 2016/0107509 | A1* | 4/2016 | Kirsch | B60H 1/00742 165/202 |
| 2016/0114649 | A1* | 4/2016 | Geissenhoener | B60H 1/00657 701/36 |
| 2016/0137035 | A1* | 5/2016 | Yoon | B60H 3/0092 62/78 |
| 2016/0144689 | A1* | 5/2016 | Miller | B60H 1/00964 165/202 |
| 2016/0152112 | A1* | 6/2016 | Stetler | B60H 1/00428 62/235.1 |
| 2016/0159201 | A1* | 6/2016 | An | B60H 1/00978 340/438 |
| 2016/0200166 | A1* | 7/2016 | Stanek | B60H 1/00657 165/202 |
| 2016/0207374 | A1* | 7/2016 | Gauthier | B60H 1/00742 |
| 2016/0207375 | A1* | 7/2016 | Gauthier | B60H 1/00778 |
| 2016/0244010 | A1* | 8/2016 | Tseng | B60R 16/037 |
| 2016/0263961 | A1* | 9/2016 | Treharne | B60H 1/00278 |
| 2016/0263962 | A1* | 9/2016 | Li | B60H 1/00657 |
| 2016/0280040 | A1* | 9/2016 | Connell | B60H 1/00771 |
| 2016/0280160 | A1* | 9/2016 | MacNeille | G05B 15/02 |
| 2016/0318368 | A1* | 11/2016 | Alger | B60H 1/00771 |

(56) References Cited

U.S. PATENT DOCUMENTS

| | | | | |
|---|---|---|---|---|
| 2016/0347149 A1* | 12/2016 | Rustoni | .............. | B60H 1/00771 |
| 2016/0368345 A1* | 12/2016 | Farooq | ............... | B60H 1/00778 |
| 2017/0028811 A1* | 2/2017 | Jayasundera | ...... | B60H 1/00742 |
| 2017/0036511 A1* | 2/2017 | Lee | .................... | B60H 1/00771 |
| 2017/0046957 A1* | 2/2017 | Jordens | .............. | B60H 1/00778 |
| 2017/0124873 A1* | 5/2017 | Semsey | ................... | G08G 1/14 |
| 2017/0190233 A1* | 7/2017 | Wittliff, III | ........ | B60H 1/00742 |
| 2017/0225537 A1* | 8/2017 | Kulthe | ............... | B60H 1/00771 |
| 2017/0274730 A1* | 9/2017 | Boss | ................. | B60H 1/00878 |
| 2017/0305234 A1* | 10/2017 | Krofchalk | .......... | B60H 1/00778 |
| 2017/0334263 A1* | 11/2017 | Schumacher | ...... | B60H 1/00285 |
| 2017/0334380 A1* | 11/2017 | Bonnet | ................ | B60R 16/037 |

* cited by examiner

METHOD OF CONTROLLING CLIMATE IN A PARKED VEHICLE

TECHNICAL FIELD

This document relates generally to vehicle heating/cooling systems, and more specifically to a method of controlling a temperature within a vehicle passenger compartment of a parked vehicle.

BACKGROUND

It is well known that key fobs are used to provide remote vehicle start functions. For example, pressing a button on a key fob can remotely start a parked vehicle when the weather is cold thereby warming a vehicle passenger compartment prior to the vehicle owner's arrival at the vehicle. Once the vehicle is running, some of the devices within the vehicle that were left in an "on" state will necessarily resume providing their functions. For example, if the climate control system is turned to a defrost mode and the temperature set on "HI," then turning on the engine of the parked vehicle will result in the temperature in the vehicle passenger compartment being raised once there is sufficient heat within the vehicle systems. Alternatively, if the climate control system is turned to a cooling mode and the temperature set on "LOW," then turning on the engine of the parked vehicle will result in the temperature in the vehicle passenger compartment being lowered at the outset.

While this key fob feature is widely lauded by vehicle owners, there are constraints on its usefulness. First, the vehicle owner has to remember to press the proper button on the key fob in order to initiate the cooling or heating action. This must be done at the proper time prior to the vehicle owner's anticipated departure time. If the vehicle owner forgets to initiate these actions, even for five minutes, there may be insufficient time prior to the departure time to allow the temperature within the vehicle passenger compartment to be properly adjusted. In other words, the temperature in the passenger compartment will not reach an optimal level. Even more, if the vehicle owner initiates these actions too soon, there may be too much time prior to the departure time and the temperature within the vehicle passenger compartment could become extremely hot or extremely cold prior to the departure time. Again, the temperature in the passenger compartment will not be at an optimal level. Even more, initiating the actions too soon results in an unnecessary use of fuel.

Second, for a commute after work, there is often not enough time to remotely start the parked vehicle to allow the temperature within the vehicle passenger compartment to reach the optimal level. This can be due to a vehicle owner's inability to take time to press the key fob within a proper distance of the parked vehicle or to the fact that some vehicle owners will have a place of work positioned too remote from a parking area or parking garage to utilize their key fob to initiate these actions. In these instances, the key fob feature is useless.

In addition to timing issues, and thirdly, the key fob could malfunction or stop working altogether due to a failure within key fob components or a dead battery used to power the key fob. In these instances, vehicle owners are again deprived of the benefit of the key fob actions altogether. Last, vehicle owners have to order the more expensive key fob with a remote start option in order to utilize the desired actions. This can be unpalatable to a potential vehicle owner that does not need the additional features commonly provided with the more expensive key fob, or is unwilling to pay for the other features.

Accordingly, a need exists for a way to control a temperature in a vehicle passenger compartment of a parked vehicle without requiring a key fob. Ideally, an exact time for initiation of a climate control system could be predetermined or preprogrammed without the need for a vehicle owner to remember to initiate any actions. Also, the actual temperature in the vehicle passenger compartment could be determined and compared to an optimal or desired temperature in order to determine whether the climate control system operates in a heating or a cooling mode. Even more, the temperature within the vehicle passenger compartment could be monitored in order to stop the heating or cooling mode when the actual temperature approaches or exceeds the desired temperature. Alternatively, operation of the climate control system could simply be turned off, and the engine of the parked vehicle turned off, at a predetermined time. This would avoid wastefulness in the event the vehicle owner did not return to the vehicle at the expected time or otherwise. In addition, these actions could be programmed into the vehicle computer or controller for operation without the need for actuation through a key fob or other remote device such as a cellular telephone or the like.

SUMMARY OF THE INVENTION

In accordance with the purposes and benefits described herein, a method is provided of controlling temperature in a vehicle passenger compartment of a parked vehicle. The method may be broadly described as comprising the steps of: sensing a temperature ($T_{IN}$) inside the vehicle passenger compartment at a predetermined time ($t_P$); comparing the sensed temperature ($T_{IN}$) to a preferred temperature ($T_P$); confirming an absence of any object positioned within a distance of a front and a rear of the parked vehicle; turning on an engine of the parked vehicle if the absence of any object within a distance of the front and the rear of the parked vehicle is confirmed and the sensed temperature ($T_{IN}$) is not substantially equal to the preferred temperature ($T_P$); and utilizing a climate control system of the parked vehicle to change the temperature ($T_{IN}$) inside the vehicle passenger compartment.

In one possible embodiment, the method further includes the steps of comparing the predetermined time ($t_P$) to a current time ($t_C$), and initiating the remaining steps when said predetermined time ($t_P$) is the same as the current time ($t_C$).

In one other possible embodiment, the method further includes the steps of repeating the step of confirming the absence of any objects positioned within a distance of the front and the rear of the parked vehicle, and turning off the engine of the parked vehicle if the absence of any objects within a distance of the front and the rear of the vehicle is not confirmed.

In another possible embodiment, the step of utilizing the climate control system of the parked vehicle includes the step of using a cooling system to lower the temperature inside the vehicle passenger compartment when the sensed temperature ($T_{IN}$) is above the preferred temperature ($T_P$). In still another possible embodiment, the method further includes the step of opening at least one window of the parked vehicle utilizing at least one drive motor associated with the at least one window.

In yet another possible embodiment, the step of utilizing the climate control system of the parked vehicle includes the step of using a heating system to raise the temperature inside the vehicle passenger compartment when the sensed temperature ($T_{IN}$) is below the preferred temperature ($T_P$). In another possible embodiment, the method further includes the step of turning on at least one seat warmer. In still another possible embodiment, the method further includes the step of turning on at least one side mirror warmer and/or a rear window defroster.

In one other possible embodiment, the method further includes the step of turning off the engine of the parked vehicle a predetermined amount of time ($t_{OFF}$) after turning on the engine.

In yet one other possible embodiment, the method further includes the steps of repeating the step of sensing a temperature ($T_{IN}$) inside the vehicle passenger compartment at predetermined time periods following the step of turning on the engine of the parked vehicle, and turning off the engine of the parked vehicle when the sensed temperature ($T_{IN}$) rises above the preferred temperature ($T_P$).

In still another possible embodiment, the method further includes the step of delaying the step of turning off the engine of the parked vehicle when the sensed temperature ($T_{IN}$) rises above the preferred temperature ($T_P$) for a predetermined period of time following the sensing step that determined the sensed temperature ($T_{IN}$) to be above the preferred temperature ($T_P$).

In accordance with a second aspect of the invention, a method is provided of controlling a temperature within a vehicle passenger compartment of a parked vehicle, comprising the steps of establishing a preferred temperature ($T_P$) inside the vehicle passenger compartment and a predetermined time ($t_P$) for sensing an actual temperature ($T_{IN}$) inside the vehicle passenger compartment, comparing the actual temperature ($T_{IN}$) sensed at time ($t_P$) to the preferred temperature ($T_P$), sensing whether the parked vehicle is parked in a confined space, turning on an engine of the parked vehicle if the parked vehicle is not parked in a confined space and the actual temperature ($T_{IN}$) is above or below the preferred temperature ($T_P$), and utilizing a climate control system of the parked vehicle to change the actual temperature ($T_{IN}$) to the preferred temperature ($T_P$).

In one other possible embodiment, the establishing step includes programming the preferred temperature ($T_P$) and the predetermined time ($t_P$) for sensing an actual temperature ($T_{IN}$) inside the vehicle passenger compartment into a climate control program.

In another possible embodiment, the programming step includes accessing the climate control program utilizing a user interface within the parked vehicle, and setting the preferred temperature ($T_P$) and the predetermined time ($t_P$) for sensing an actual temperature ($T_{IN}$) inside the vehicle passenger compartment.

In still another possible embodiment, the establishing step includes programming a first preferred temperature ($T_P$) and a first predetermined time ($t_P$) for sensing an actual temperature ($T_{IN}$) inside the vehicle passenger compartment, and a second preferred temperature ($T_P$) and a second predetermined time ($t_P$) for sensing an actual temperature ($T_{IN}$) inside the vehicle passenger compartment into a climate control program.

In accordance with a third aspect of the invention, a method is provided of controlling a temperature within a vehicle passenger compartment of a parked vehicle, comprising the steps of establishing a preferred temperature ($T_P$) inside the vehicle passenger compartment and a predetermined time ($t_P$) for sensing an actual temperature ($T_{IN}$) inside the vehicle passenger compartment, sensing the actual temperature ($T_{IN}$) inside the vehicle passenger compartment at the predetermined time ($t_P$), comparing the actual temperature ($T_{IN}$) to the preferred temperature ($T_P$), determining whether the parked vehicle is in a confined space, turning on an engine of the parked vehicle if the parked vehicle is not in a confined space and the actual temperature ($T_{IN}$) is above or below the preferred temperature ($T_P$), utilizing a climate control system of the vehicle to change the actual temperature ($T_{IN}$) to a temperature closer to the preferred temperature ($T_P$), and turning off the engine of the parked vehicle after a predetermined period of time ($T_{RUN}$).

In one other possible embodiment, the establishing step further includes establishing the predetermined period of time ($T_{RUN}$).

In yet another possible embodiment, the step of utilizing the climate control system of the parked vehicle includes using a cooling system to lower the temperature inside the vehicle passenger compartment when the actual temperature ($T_{IN}$) is above the preferred temperature ($T_P$).

In still another possible embodiment, the step of utilizing the climate control system of the parked vehicle includes using a heating system to raise the temperature inside the vehicle passenger compartment when the actual temperature ($T_{IN}$) is below the preferred temperature ($T_P$).

In one other possible embodiment, the method further includes the steps of repeating the step of sensing a temperature ($T_{IN}$) inside the vehicle passenger compartment following the step of utilizing the climate control system of the vehicle to change the actual temperature ($T_{IN}$) to a temperature closer to the preferred temperature ($T_P$), and turning off the engine of the parked vehicle when the actual temperature ($T_{IN}$) rises above the preferred temperature ($T_P$).

In the following description, there are shown and described several embodiments of a method of controlling a temperature within a vehicle passenger compartment of a parked vehicle. As it should be realized, the methods and systems are capable of other, different embodiments and their several details are capable of modification in various, obvious aspects all without departing from the methods and assemblies as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the vehicle and method and together with the description serve to explain certain principles thereof. In the drawing figures.

Reference will now be made in detail to the present preferred embodiments of the method of controlling temperature in a vehicle passenger compartment of a parked vehicle, examples of which are illustrated in the accompanying drawing figures, wherein like numerals are used to represent like elements.

DETAILED DESCRIPTION

Figure 1:
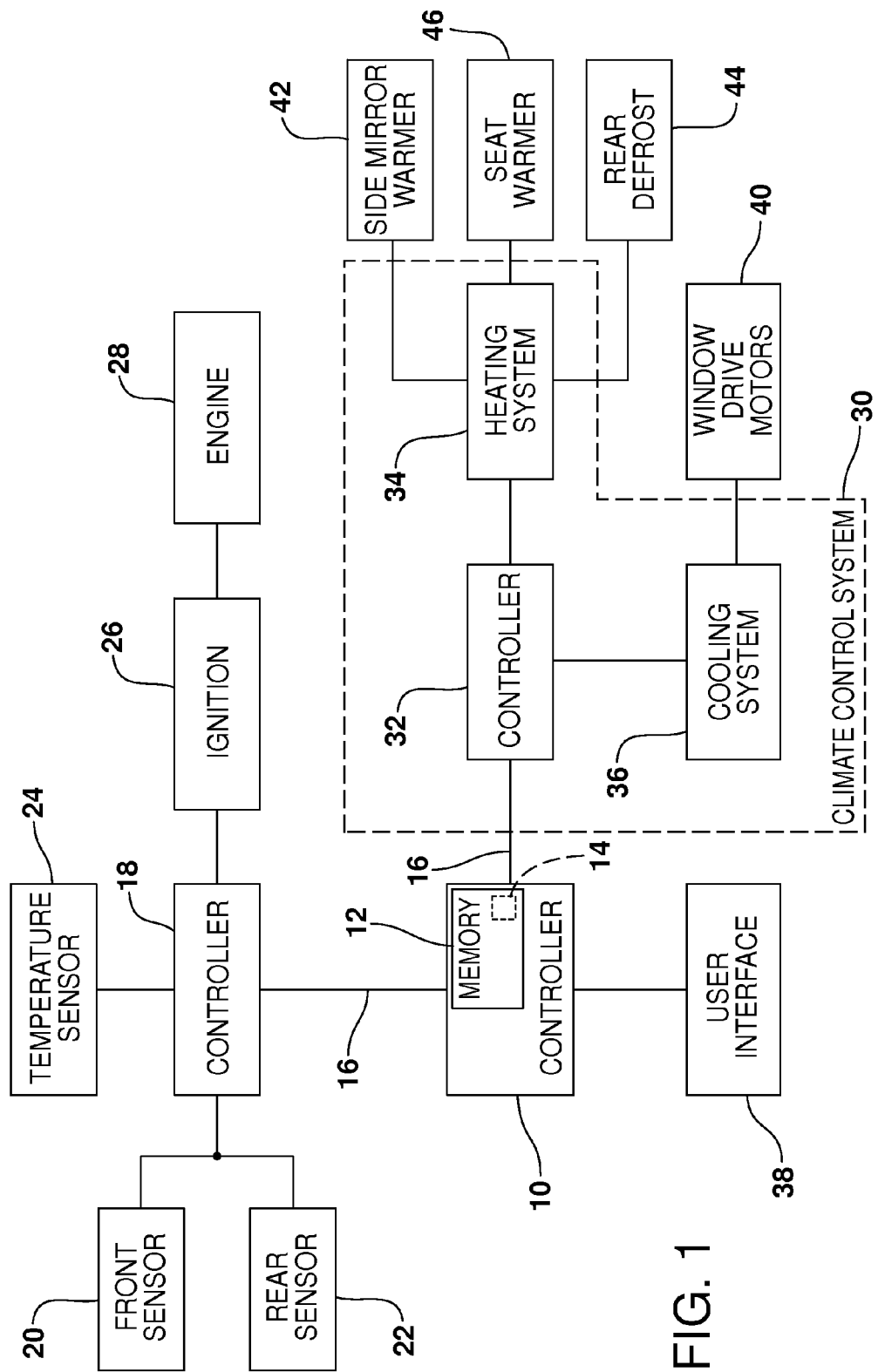
FIG. 1 is a is a block diagram of an exemplary vehicle control module including a plurality of controllers interconnected by a controller area network (CAN) bus.

Reference is now made to FIG. 1 which illustrates a schematic diagram of an exemplary vehicle control module including a plurality of controllers interconnected by a controller area network (CAN) bus, as is known in the art, for controlling varying aspects of a parked vehicle (V). As shown in FIG. 1, a first controller 10 includes a memory 12 wherein a climate control program 14 is stored. The first controller 10 continuously monitors a current time ($t_C$) where the vehicle is located and, possibly, a date and a day of a week.

When the current time ($t_C$) is equal to a predetermined time ($t_P$), the first controller 10 communicates via the CAN bus 16 with a second controller 18. The second controller 18 activates a front sensor 20 and a rear sensor 22 to sense for objects positioned within a distance of a front and a rear of the parked vehicle (V). In other words, the sensors sense or determine whether the parked vehicle (V) is parked in a confined space (e.g., a garage). If either the front sensor 20 or the rear sensor 22 senses the presence of an object within the specified distance of the front or the rear of the parked vehicle, then no action is taken and the first controller 10 returns to monitoring the current time ($t_C$) until the current time equals a next predetermined time ($t_{P+1}$).

If an absence of any objects within the specified distance of the front or the rear of the parked vehicle (V) is confirmed by the second controller 18 and sensors 20, 22, then the second controller activates a temperature sensor 24 within a vehicle passenger compartment. The temperature sensor 24 senses a temperature ($T_{IN}$) within the vehicle passenger compartment, i.e., the actual temperature inside the vehicle. The second controller 18 communicates the sensed temperature ($T_{IN}$) to the first controller 10 via the CAN bus 16 and the first controller determines whether the sensed temperature ($T_{IN}$) is the same as a predetermined temperature ($T_P$). If the temperatures are the same, then no action is taken and the first controller 10 returns to monitoring the current time ($t_C$) until the current time equals the next predetermined time ($t_{P+1}$).

If the temperatures are not the same, then the first controller 10 communicates with the second controller 18 to activate an electronic ignition 26 of the parked vehicle (V). In a customary manner, the electronic ignition 26 starts or turns on an engine 28 of the parked vehicle (V). In the described embodiment, the first controller 10 also sets an "auto temp" feature of a climate control system 30 to the preferred temperature ($T_P$). In this manner, the climate control system 30 will be automatically adjusted by a third controller 32 to make the actual or sensed temperature ($T_{IN}$) in the vehicle passenger compartment equal to the preferred temperature ($T_P$).

In order to determine whether a heating system 34 or a cooling system 36 of the climate control system 30 is required, the preferred temperature ($T_P$) is compared to the sensed temperature ($T_{IN}$) by the first controller 10. If the sensed temperature ($T_{IN}$) is greater than the preferred temperature ($T_P$), then the cooling system 36 is engaged. In an alternate embodiment, additional actions may be taken to cool the vehicle passenger compartment. For example, the third controller 32 may lower one or more windows by activating one or more window drive motors 40. If the sensed temperature ($T_{IN}$) is not greater than the preferred temperature ($T_P$), then the heating system 34 is engaged. In an alternate embodiment, additional actions may be taken to prepare the parked vehicle (V) in heating mode. For example, the third controller 32 may activate side mirror warmers 42 and/or a rear defrost 44 to ensure any snow or ice is melted, and seat warmers 46.

In the described embodiment, either the heating system 34 or the cooling system 36 is engaged for a predetermined period of time of twenty (20) minutes. In other embodiments, the predetermined period of time can be adjusted utilizing a user interface 38 to access the climate control program 14 as described below. In alternate embodiments, either the heating system 34 or the cooling system 36 may be engaged until the preferred temperature ($T_P$) is equal to the sensed temperature ($T_{IN}$) rather than for a predetermined period.

In such alternate embodiments, the temperature sensor 24 could continuously sense the temperature ($T_{IN}$) inside the vehicle passenger compartment. Alternatively, the second controller 18 could activate the temperature sensor 24 occasionally or at predetermined times or intervals, or simply monitor the sensed temperature ($T_{IN}$) occasionally or at predetermined times or intervals once the engine 28 has been turned on. The second controller 18 may further turn off the engine 28 of the parked vehicle (V) when the sensed temperature ($T_{IN}$) rises above the preferred temperature ($T_P$).

In yet another alternate embodiment, the engine 28 may be allowed to remain running when the sensed temperature ($T_{IN}$) rises above the preferred temperature ($T_P$) for a predetermined period of time ($t_H$). Delaying the turning off of the engine 28 limits or avoids the possibility that the sensed temperature ($T_{IN}$) quickly rises and/or falls above and/or below the preferred temperature ($T_P$) possibly causing the engine 28 to turn on and off in rapid fashion.

Figure 2:
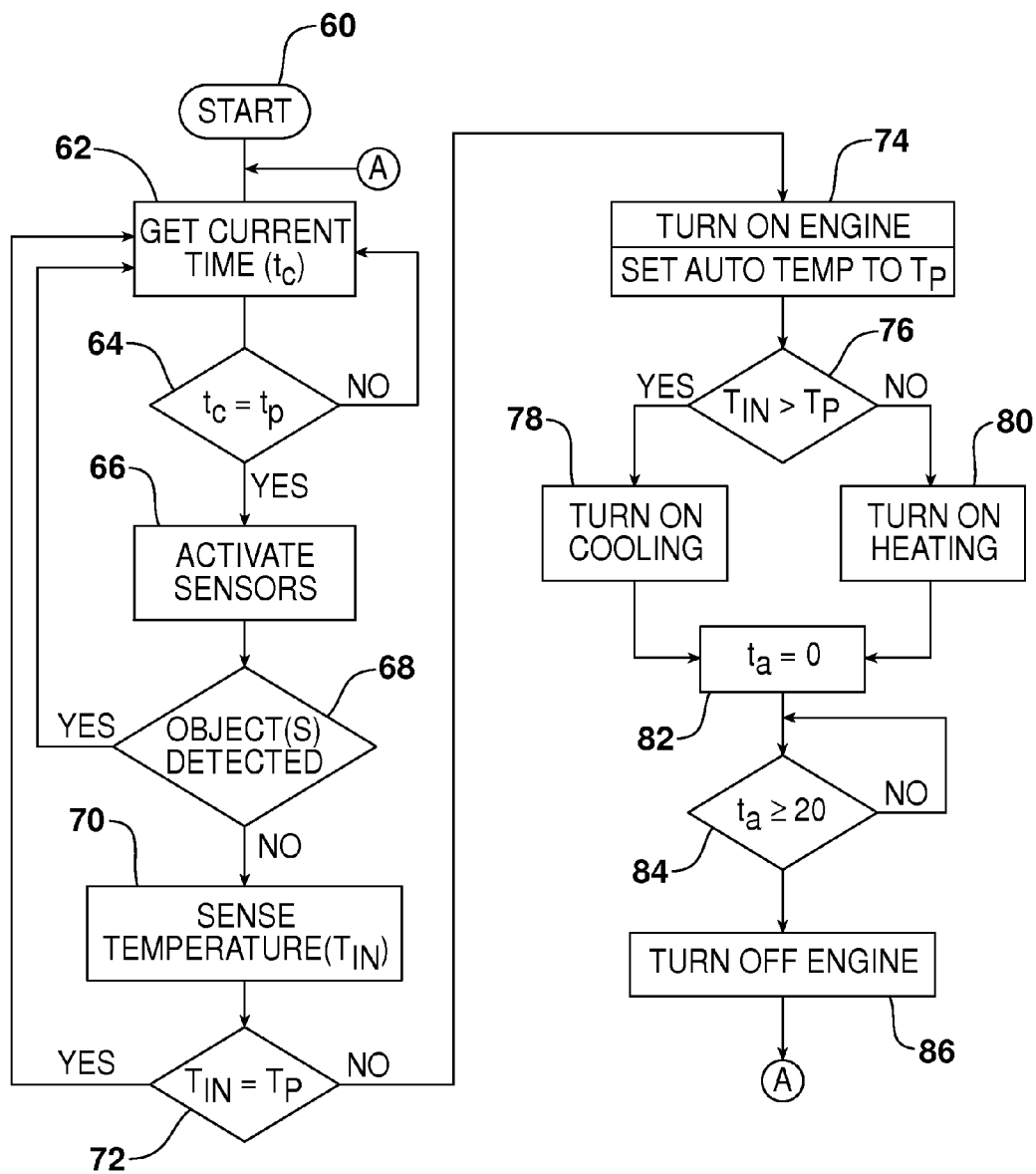
FIG. 2 is a flow chart schematic for controlling temperature in a vehicle passenger compartment of a parked vehicle.

The steps utilized in the described embodiment will be described with reference to FIG. 2. FIG. 2 is a flowchart of operational control of the climate control system 30 of the parked vehicle (V) according to the described embodiment. The processing sequence related to operational control of the climate control system 30 according to the described embodiment is executed by a processor of one or more of the controllers (e.g., 10, 18, 32) communicating via a CAN bus 16 as the climate control program 14 stored in memory 12. Upon initiation of the sequence at Step 60, a current time ($t_C$) is retrieved from the controller 10 at Step 62. The current time ($t_C$) is then compared to a predetermined time ($t_P$), or a preselected start time at Step 64. If the current time ($t_C$) is not equal to the predetermined time ($t_P$), then the sequence returns to Step 62 and retrieves a new current time ($t_{C+1}$) for comparison to the predetermined time ($t_P$).

If the current time ($t_C$) is equal to the predetermined time ($t_P$) at Step 64, then the front and rear sensors 20, 22 are activated by the controller 18 at Step 66. Both the front and rear sensors 20, 22 sense an area within a distance of a front and a rear of the parked vehicle (V) for the presence or absence of any objects. If the front and rear sensors 20, 22 do not confirm an absence of any objects positioned within a distance of a front and a rear of the parked vehicle (V) at Step 68, then the sequence returns to Step 62 and retrieves a new current time ($t_{C+1}$) for comparison to the next predetermined time ($t_{P+1}$).

In other words, the initial sequence that began at 7:15 am, for example, is terminated and the sequence will reenter a holding pattern by looping through Steps 62 and 64 until a next programmed time ($t_{P+1}$) (e.g., 4:45 pm) is scheduled to initiate utilization of the climate control system 30. The reason for termination of the first sequence was due to an obstruction in front or behind the parked vehicle (V). Since such an obstruction could indicate that the vehicle was parked in a confined area, such as a garage, the sequence will not progress and turn on the parked vehicle's engine 28 due to risks associated with carbon monoxide buildup in the confined area.

In the event the front and rear sensors 20, 22 confirm an absence of any objects positioned within a distance of a front and a rear of the parked vehicle (V) at Step 68, then a temperature ($T_{IN}$) within the passenger compartment of the parked vehicle (V) is sensed at Step 70. The sensed temperature ($T_{IN}$) inside the passenger compartment is then compared to a predetermined temperature ($T_P$) at Step 72. The predetermined temperature ($T_P$) is an optimal temperature selected by the vehicle owner and programmed into the vehicles' climate control program 14. If the sensed temperature ($T_{IN}$) inside the passenger compartment is equal to the predetermined temperature ($T_P$) at Step 72, or within a specified range encompassing the predetermined time ($T_P$) in an alternate embodiment, then the sequence returns to Step 62 and retrieves a new current time ($t_{C+1}$) for comparison to a next programmed time ($t_{P+1}$).

In other words, the initial sequence that began at 7:15 am, for example, is terminated and the sequence will reenter a holding pattern by looping through Steps 62 and 64 until the next programmed time ($t_{P+1}$) (e.g., 4:45 pm) is scheduled to initiate utilization of the climate control system 30. The reason for termination of the sequence is due to the temperature ($T_{IN}$) within the passenger compartment already equaling the predetermined or optimal temperature ($T_P$). Thus, there is no need to engage the climate control system 30.

In the event the sensed temperature ($T_{IN}$) inside the passenger compartment $T_{IN}$ is not equal to the predetermined temperature ($T_P$) at Step 72, then controller 18 signals the electronic ignition 26 to start or turn on the engine 28 at Step 74. The sequence also sets an "auto temp" of the climate control system 30 to equal the predetermined temperature ($T_P$) at Step 74. In this manner, the climate control system 30 of the parked vehicle (V) may be utilized to change the actual temperature ($T_{IN}$) to the preferred temperature ($T_P$), or to a temperature closer to the preferred temperature ($T_P$), inside the vehicle passenger compartment.

At Step 76, the actual temperature ($T_{IN}$) inside the vehicle passenger compartment is compared to the preferred temperature ($T_P$) to determine whether to engage the parked vehicle's cooling system 36 or heating system 34. If the actual temperature ($T_{IN}$) inside the vehicle passenger compartment is greater than the preferred temperature ($T_P$), then the cooling system 36 is turned on at Step 78. Alternatively, if the actual temperature ($T_{IN}$) inside the vehicle passenger compartment is less than the preferred temperature ($T_P$), then the heating system 34 is turned on at Step 80.

Regardless of whether the cooling system 36 is turned on at Step 78 or the heating system 34 is turned on at Step 80, a timer ($t_a$) is initialized at Step 82. The timer ($t_a$) is then monitored at Step 84, looping immediately back to Step 84, until an elapsed time is equal to or greater than twenty minutes. Once time ($t_a$) reaches 20 minutes or more, then the parked vehicle's engine 28 is turned off at Step 86 and the sequence reinitiates and obtains a next current time used to determine a next initiation of the parked vehicle's climate control system 30.

At any point, the vehicle owner can establish a preferred temperature ($T_P$) inside the vehicle passenger compartment and a predetermined time ($t_P$) for sensing an actual temperature ($T_{IN}$) inside the vehicle passenger compartment by programming the preferred temperature ($T_P$) and the predetermined time ($t_P$) into the climate control program 14. As indicated above and shown in FIG. 1, the climate control program 14 is stored in a memory 12 within controller 10 which may be accessed by a third controller 32 associated with the climate control system 30. In operation, the above-described sequence running on the third controller 32 may access the established preferred temperature ($T_P$) and the predetermined time ($t_P$) for sensing an actual temperature ($T_{IN}$) inside the vehicle passenger compartment stored in the memory 12 via the CAN bus 16.

Figure 3:
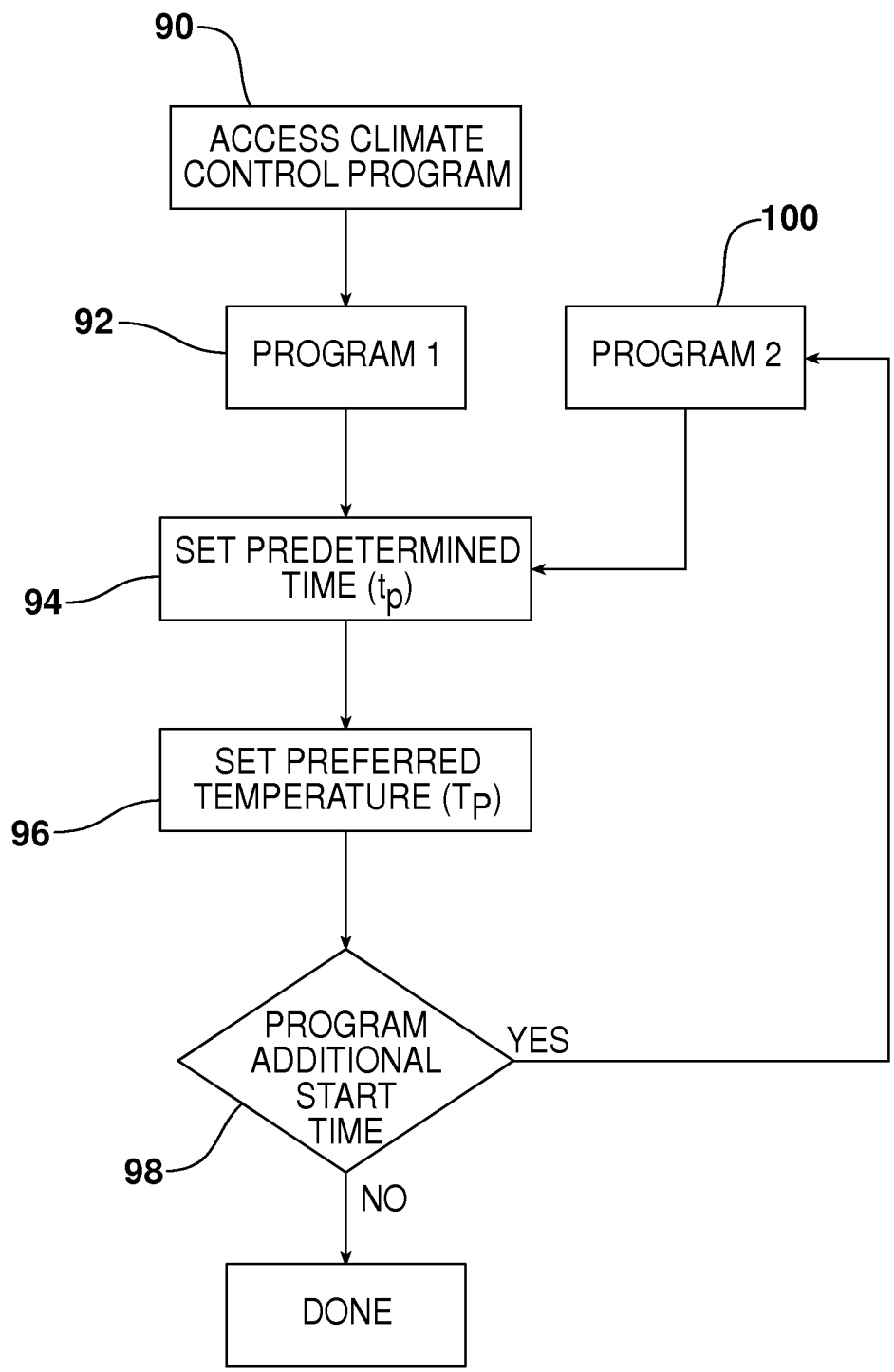
FIG. 3 is a flow chart schematic for programming a climate control program.

As best shown in FIG. 3, a sequence for programming the preferred temperature ($T_P$) and the predetermined time ($t_P$) into the climate control program 14 includes accessing the climate control program utilizing user interface 38 within the parked vehicle (V) at Step 90. Once the climate control program 14 is accessed, a first program, i.e., Program 1, is created at Step 92. Within the Program 1, a predetermined time ($t_P$) is set via the user interface 38 at Step 94. The predetermined time ($t_P$) is, for example, a time in the morning that the vehicle owner desires their parked vehicle (V) to determine a temperature ($T_{IN}$) within the vehicle passenger compartment and to take certain necessary steps to change the temperature, if needed, and as desired.

Also within the Program 1, a preferred temperature ($T_P$) is set via the user interface 38 at Step 96. The preferred temperature ($T_P$) is, for example, a temperature within the vehicle passenger compartment that the vehicle owner desires to have shortly after the predetermined time ($t_P$). For instance, the vehicle owner may want the vehicle passenger compartment temperature to be 70° at 8:00 am for their morning commute. To accomplish this goal, the vehicle owner could establish Program 1 having a predetermined time ($t_P$) of 7:40 am and a preferred temperature ($T_P$) of 70°. This would allow sufficient time for the parked vehicle (V) to take the necessary steps beginning at 7:40 am to change the temperature within the vehicle passenger compartment to the preferred temperature ($T_P$) by 8:00 am, which is the desired departure time of the vehicle owner.

At Step 98, the vehicle owner can decide whether to establish a second program, i.e., Program 2. The Program 2 is established in the same manner as Program 1 at Step 100. Within the Program 2, a second predetermined time ($t_{P2}$) is set at Step 94. The second predetermined time ($t_{P2}$) is, for example, a time in the evening that the vehicle owner desires their parked vehicle (V) to determine a temperature ($T_{IN}$) within the vehicle passenger compartment and to take certain necessary steps to change the temperature, if needed and as desired.

Also within the Program 2, a second preferred temperature ($T_{P2}$) is set at Step 96. The second preferred temperature ($T_{P2}$) is, for example, a temperature within the vehicle passenger compartment that the vehicle owner desires to have shortly after the second predetermined time ($t_{P2}$). For instance, the vehicle owner may want the vehicle passenger compartment temperature to be 68° at 5:30 pm for their commute home from work. To accomplish this goal, the vehicle owner could establish a Program 2 having a second predetermined time ($t_{P2}$) of 5:10 pm and a second preferred temperature ($T_{P2}$) of 68°. This would allow sufficient time for the parked vehicle to take the necessary steps to change the temperature within the vehicle passenger compartment at 5:10 pm to the second preferred temperature ($T_{P2}$) at 5:30 pm, which is the desired departure time of the vehicle owner.

Two programs (Program 1 and Program 2) are established in the described embodiment. However, more or fewer programs may be established in accordance with the invention. For example, Programs 1 and 2 described above could be limited to weekdays and rendered inoperative on weekend days. In addition, specific dates (e.g., vacation days, holidays, etc.) could likewise be rendered inoperative despite falling on weekdays where Programs 1 and 2 would typically be executed. Even more, any number of programs can be established. For example, a different program could be established for each day of the week or year having different preferred temperatures and predetermined times. In addition, more than two programs can be established on any given day or a predetermined time ($t_P$) could be established to be one hour, for example, after the vehicle was last locked.

In summary, numerous benefits result from the method of controlling temperature in a vehicle passenger compartment of a parked vehicle as illustrated in this document. The method is capable of controlling the temperature in the vehicle passenger compartment of a parked vehicle without requiring a key fob. In fact, an exact time for initiation of a climate control system can be predetermined or preprogrammed without the need for the vehicle owner to remember to initiate any actions. Also, the actual temperature in the vehicle passenger compartment can be determined and compared to the optimal or desired temperature in order to determine whether the climate control system operates in the heating or the cooling mode. Even more, the temperature within the vehicle passenger compartment can be monitored in order to stop the heating or cooling mode when the actual temperature approaches or exceeds the desired temperature.

The foregoing has been presented for purposes of illustration and description. It is not intended to be exhaustive or to limit the embodiments to the precise form disclosed. Obvious modifications and variations are possible in light of the above teachings. For example, operation of the climate control system can simply be turned off, and the engine of the parked vehicle turned off, at a predetermined time. This avoids wastefulness in the event the vehicle owner did not return to the vehicle at the expected time or otherwise. In addition, these actions can be programmed into the vehicle computer or controller for operation without the need for actuation through a key fob or other remote device such as a cellular telephone or the like. All such modifications and variations are within the scope of the appended claims when interpreted in accordance with the breadth to which they are fairly, legally and equitably entitled.

What is claimed:

1. A method of controlling temperature in a vehicle passenger compartment of a parked vehicle, comprising the steps of:
   sensing a temperature ($T_{IN}$) inside the vehicle passenger compartment at a predetermined time ($t_P$);
   comparing the sensed temperature ($T_{IN}$) to a preferred temperature ($T_P$);
   confirming an absence of any objects positioned within a distance of a front and a rear of the parked vehicle;
   turning on an engine of the parked vehicle if the absence of any object within a distance of the front and the rear of the parked vehicle is confirmed and the sensed temperature ($T_{IN}$) is not substantially equal to the preferred temperature ($T_P$); and
   utilizing a climate control system of the parked vehicle to change the temperature ($T_{IN}$) inside the vehicle passenger compartment.

2. The method of controlling temperature in a vehicle passenger compartment of a parked vehicle of claim 1, further comprising the steps of comparing the predetermined time ($t_P$) to a current time ($t_C$), and initiating the remaining steps when said predetermined time ($t_P$) is the same as the current time ($t_C$).

3. The method of controlling a temperature in a vehicle passenger compartment of a parked vehicle of claim 1, further comprising the steps of repeating the step of confirming the absence of any objects positioned within a distance of the front and the rear of the parked vehicle, and turning off the engine of the parked vehicle if the absence of any objects within a distance of the front and the rear of the vehicle is not confirmed.

4. The method of controlling a temperature in a vehicle passenger compartment of a parked vehicle of claim 1, wherein the step of utilizing the climate control system of the parked vehicle includes the step of using a cooling system to lower the temperature inside the vehicle passenger compartment when the sensed temperature ($T_{IN}$) is above the preferred temperature ($T_P$).

5. The method of controlling a temperature in a vehicle passenger compartment of a parked vehicle of claim 4, further comprising the step of opening at least one window of the parked vehicle utilizing at least one drive motor associated with the at least one window.

6. The method of controlling a temperature in a vehicle passenger compartment of a parked vehicle of claim 1, wherein the step of utilizing the climate control system of the parked vehicle includes the step of using a heating system to raise the temperature inside the vehicle passenger compartment when the sensed temperature ($T_{IN}$) is below the preferred temperature ($T_P$).

7. The method of controlling a temperature in a vehicle passenger compartment of a parked vehicle of claim 6, further comprising the step of turning on at least one seat warmer.

8. The method of controlling a temperature in a vehicle passenger compartment of a parked vehicle of claim 6, further comprising the step of turning on at least one side mirror warmer.

9. The method of controlling a temperature in a vehicle passenger compartment of a parked vehicle of claim 1, further comprising the step of turning off the engine of the parked vehicle a predetermined amount of time ($t_{OFF}$) after turning on the engine.

10. The method of controlling a temperature in a vehicle passenger compartment of a parked vehicle of claim 1, further comprising the steps of repeating the step of sensing a temperature ($T_{IN}$) inside the vehicle passenger compartment at predetermined time periods following the step of turning on the engine of the parked vehicle, and turning off the engine of the parked vehicle when the sensed temperature ($T_{IN}$) rises above the preferred temperature ($T_P$).

11. The method of controlling a temperature in a vehicle passenger compartment of a parked vehicle of claim 10, further comprising the step of delaying the step of turning off the engine of the parked vehicle when the sensed temperature ($T_{IN}$) rises above the preferred temperature ($T_P$) for a predetermined period of time ($t_H$) following the sensing step that determined the sensed temperature ($T_{IN}$) to be above the preferred temperature ($T_P$).

12. The method of controlling temperature in a vehicle passenger compartment of a parked vehicle of claim 1, further comprising the step of establishing a preferred temperature ($T_P$) inside the vehicle passenger compartment.

13. The method of controlling temperature in a vehicle passenger compartment of a parked vehicle of claim 12, wherein the establishing step includes programming the preferred temperature ($T_P$) and the predetermined time ($t_P$) for sensing an actual temperature ($T_{IN}$) inside the vehicle passenger compartment into a climate control program.

14. The method of controlling temperature in a vehicle passenger compartment of a parked vehicle of claim 13, wherein the programming step includes accessing the climate control program utilizing a user interface within the parked vehicle, and setting the preferred temperature ($T_P$).

15. The method of controlling temperature in a vehicle passenger compartment of a parked vehicle of claim 12, wherein the establishing step includes programming a first preferred temperature ($T_P$) and a first predetermined time ($t_P$) for sensing an actual temperature ($T_{IN}$) inside the vehicle passenger compartment, and a second preferred temperature ($T_P$) and a second predetermined time ($t_P$) for sensing an actual temperature ($T_{IN}$) inside the vehicle passenger compartment into a climate control program.

16. The method of controlling temperature in a vehicle passenger compartment of a parked vehicle of claim 1, further comprising the step of establishing a preferred temperature ($T_P$) inside the vehicle passenger compartment and a predetermined time ($t_P$) for sensing an actual temperature ($T_{IN}$) inside the vehicle passenger compartment.

17. The method of controlling temperature in a vehicle passenger compartment of a parked vehicle of claim 16, wherein the step of utilizing the climate control system of the parked vehicle includes using a cooling system to change the temperature ($T_{IN}$) inside the vehicle passenger compartment to a temperature closer to the preferred temperature ($T_P$).

18. The method of controlling temperature in a vehicle passenger compartment of a parked vehicle of claim 17, wherein the step of utilizing the climate control system of the parked vehicle includes using a heating system to raise the temperature inside the vehicle passenger compartment when the temperature ($T_{IN}$) is below the preferred temperature ($T_P$).

19. The method of controlling temperature in a vehicle passenger compartment of a parked vehicle of claim 17, wherein the step of utilizing the climate control system of the parked vehicle includes using a cooling system to lower the temperature inside the vehicle passenger compartment when the temperature ($T_{IN}$) is above the preferred temperature ($T_P$).

20. The method of controlling a temperature in a vehicle passenger compartment of a parked vehicle of claim 1, further comprising the steps of establishing a preferred temperature ($T_P$) inside the vehicle passenger compartment, a predetermined time ($t_P$) for sensing an actual temperature ($T_{IN}$) inside the vehicle passenger compartment, and the predetermined period of time ($T_{RUN}$).

* * * * *